United States Patent [19]
Taniguchi et al.

[11] Patent Number: 5,285,232
[45] Date of Patent: Feb. 8, 1994

[54] RED-EYE PHENOMENON PREVENTING DEVICE

[75] Inventors: Hidenori Taniguchi; Kazuo Ikawa; Masayoshi Kiuchi; Michio Hirohata, all of Kanagawa, Japan

[73] Assignee: Canon Kabushiki Kaisha, Tokyo, Japan

[21] Appl. No.: 951,306

[22] Filed: Sep. 22, 1992

Related U.S. Application Data

[63] Continuation of Ser. No. 628,489, Dec. 17, 1990, abandoned.

[30] Foreign Application Priority Data

Dec. 21, 1989 [JP] Japan .................................. 1-331741
Dec. 21, 1989 [JP] Japan .................................. 1-331742

[51] Int. Cl.⁵ ............................................. G03B 15/05
[52] U.S. Cl. ................................. 354/415; 354/149.1; 362/12; 362/18
[58] Field of Search .............. 354/149.1, 415, 132, 354/137, 145.1, 126; 362/11, 12, 13, 16, 17, 18

[56] References Cited

U.S. PATENT DOCUMENTS

| | | | |
|---|---|---|---|
| 2,213,749 | 9/1940 | Strauss | 362/13 |
| 2,277,698 | 3/1942 | Germeshausen | 362/12 X |
| 2,542,311 | 2/1951 | Carlson | 362/12 |
| 2,682,603 | 6/1954 | Dine et al. | 362/16 |
| 3,563,650 | 2/1971 | Okuno | 362/12 X |
| 4,067,030 | 1/1978 | Kuramoto et al. | 354/126 X |
| 4,285,588 | 8/1981 | Mir | 354/137 |
| 4,464,705 | 8/1984 | Horowitz | 362/12 |
| 4,555,648 | 11/1985 | Iida et al. | 354/145.1 X |
| 4,983,998 | 1/1991 | Hirohata et al. | 354/149.1 |
| 4,999,663 | 3/1991 | Nakamura | 354/415 |
| 5,040,007 | 8/1991 | Hagiuda | 354/145.1 |
| 5,051,768 | 9/1991 | Harrison | 354/415 |
| 5,097,284 | 3/1992 | Taniguchi et al. | 354/415 |

*Primary Examiner*—W. B. Perkey
*Attorney, Agent, or Firm*—Robin, Blecker, Daley & Driscoll

[57] ABSTRACT

A red-eye phenomenon preventing device includes a light emitting part for flash photography, a light emitting part for preventing the red-eye phenomenon, a reflection shade arranged to surround the light emitting part for flash photography and the light emitting part for preventing the red-eye phenomenon, and a protector disposed in front of the light emitting part for flash photography and the light emitting part for preventing the red-eye phenomenon.

61 Claims, 10 Drawing Sheets

RED-EYE PHENOMENON PREVENTING DEVICE

This is a continuation application under 37 CFR 1.62 of prior application Ser. No. 628,489, filed Dec. 17, 1990, now abandoned.

BACKGROUND OF THE INVENTION

1. Field of the Invention

This invention relates to a device for preventing a red-eye phenomenon occurring in flash photography.

2. Description of the Related Art

Color photographs of persons sometimes show red eyes. This is called a red-eye phenomenon. This phenomenon results from the retinal blood vessels taken in the photograph as the pupil of a person is wide open in taking a picture in a dark place with the aid of an auxiliary light such as a flash light.

To prevent the red-eye phenomenon, it has been proposed in Japanese Patent Publication No. SHO 58-48088 to carry out flash photography after making the open pupil smaller by turning on a preliminary illumination lamp prior to the emission of flash light.

The preliminary illumination by a lamp must have a relatively large degree of luminance for closing the human pupil. The sufficient degree of luminance for this purpose is hardly obtainable from the use of a small lamp but rather the use of a large lamp gives sufficient luminance. However, it not only causes a cost increase but is disadvantageous in respect of practical arrangement. A method of raising the luminance of a small lamp by condensing its light with a reflection mirror is conceivable. However, this method increases not only the cost but also the size of the camera.

SUMMARY OF THE INVENTION

This invention is directed to the solution of the above-stated problems. It is, therefore, an object of the invention to provide a red-eye phenomenon preventing device which is capable of giving a sufficient red-eye phenomenon preventing effect even if the output of the red-eye phenomenon preventing light emitting part thereof is small. To attain this object, a device according to this invention comprises a light emitting part for flash photography, a light emitting part for preventing the red-eye phenomenon, a reflection shade which is arranged to surround both the light emitting part for flash photography and the light emitting part for preventing the red-eye phenomenon, and a protector which is disposed in front of the light emitting part for flash photography and the light emitting part for preventing the red-eye phenomenon.

The above and other objects and features of the invention will become apparent from the following detailed description of embodiments thereof taken in connection with the accompanying drawings.

BRIEF DESCRIPTION OF THE DRAWINGS

FIGS. 8 to 13 illustrate a third embodiment of the invention.

FIGS. 15 to 18 illustrate a fourth embodiment.

DETAILED DESCRIPTION OF THE PREFERRED EMBODIMENTS

The following describes some embodiments of this invention with reference to the accompanying drawings.

First Embodiment

Figure 1:
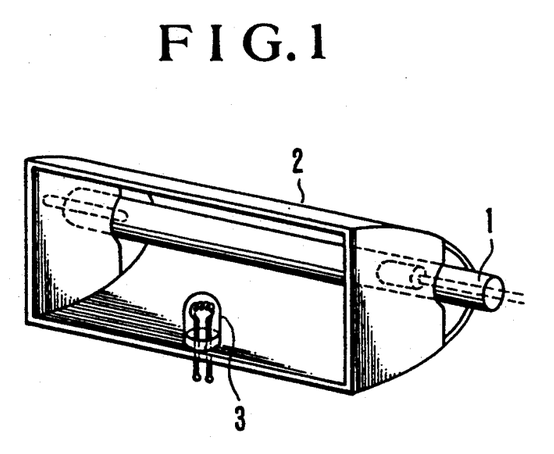
FIG. 1 is an oblique view of an electronic flash device arranged as an embodiment of this invention.
Figure 2:
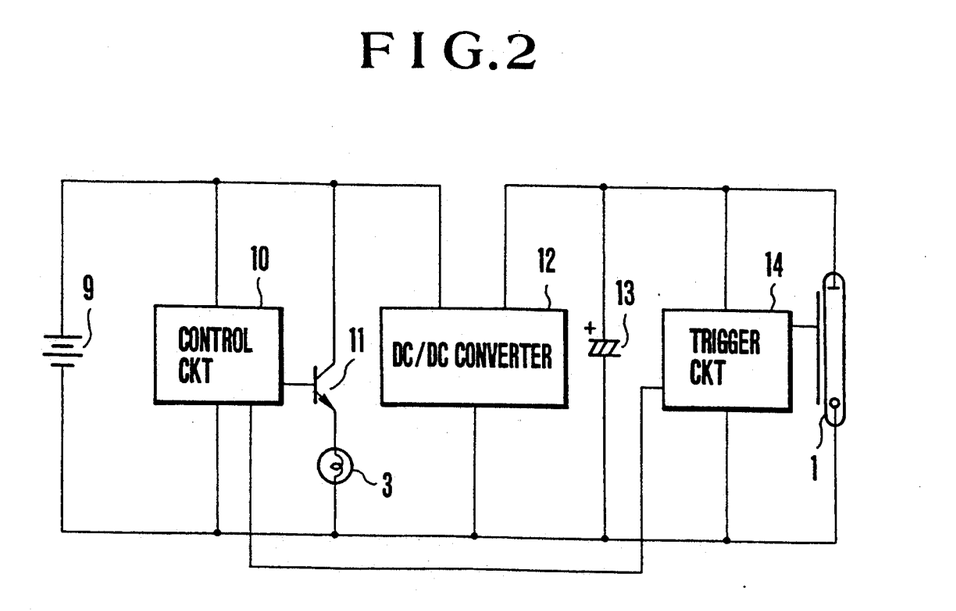
FIG. 2 is a circuit diagram showing the driving circuit of the same device of FIG. 1.

FIG. 1 shows in an oblique view an electronic flash device arranged as a first embodiment of this invention. FIG. 2 shows the driving circuit of the embodiment. Referring to FIG. 1, a xenon flash lamp 1 is employed as a light emitting part for flash photography. The lamp 1 is provided with a reflection shade 2. A preliminary illumination lamp 3 is employed as a light emitting part for preventing the red-eye phenomenon. A known protector which is not shown is disposed in front of the reflection shade 2. Referring to FIG. 2, the illustration includes a battery 9 which is employed as a power source, a control circuit 10 of the camera, a transistor 11 for turning on the preliminary illumination lamp 3, a known boosting DC/DC (DC-to-DC) converter 12, a main capacitor 13 for flashing the xenon flash lamp 1, and a known trigger circuit 14.

In the first embodiment, the preliminary illumination lamp 3 is attached to the inside of the reflection shade 2 within the light emitting part of the electronic flash device. The lamp 3 may be mounted in any part within the light emitting part. However, in the case of the embodiment, the lamp 3 is mounted on a part of the reflection shade 2. Further, as shown in FIG. 2, a driving circuit is formed by connecting the preliminary illumination lamp 3 between the emitter of the transistor 11 and the ground and by connecting the collector of the transistor 11 to the plus side of a battery 9 while the base of the transistor 11 is arranged to be controlled by the control circuit 10.

The reason for this is that since the lamp 3 for the preliminary illumination is disposed within the reflection shade 2, when a trigger voltage which is several KV and is applied to the xenon lamp 1 is induced to the lamp 3, some other element of the camera is prevented from being broken, by discharging an electric charge to the ground through the lamp 3 which has a low impedance. If the lamp 3 is connected to the plus side of the battery 9, the trigger voltage is induced to the plus side of the battery 9 through the lamp 3. This is undesirable, because a current flowing to the ground via the control circuit 10, etc., might break the control circuit 10 and other IC elements.

Figure 3:
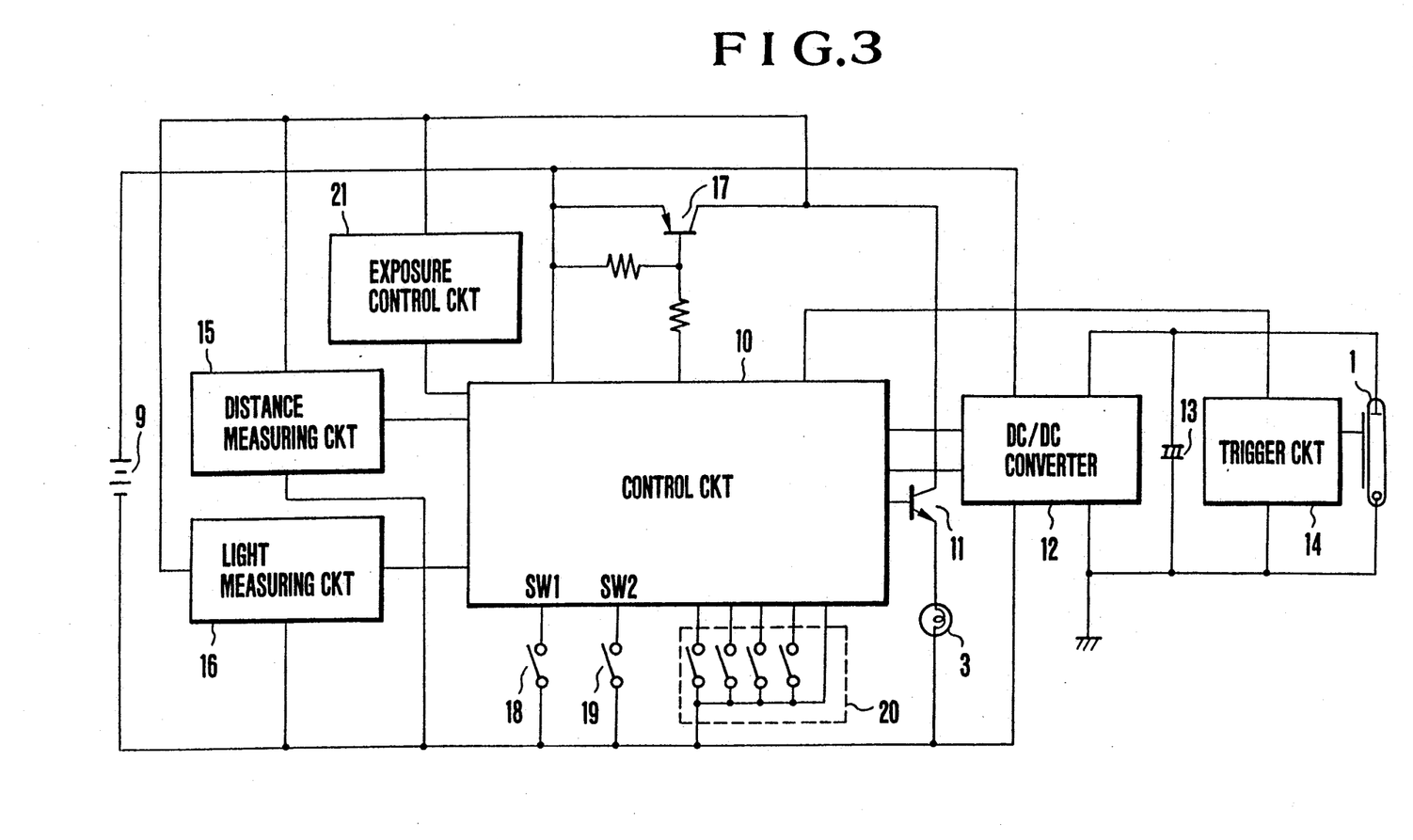
FIG. 3 is a more detailed circuit diagram including the arrangement of a camera as well as the circuit of FIG. 2.

FIG. 3 shows the further details of the circuit of FIG. 2, including some other parts of the camera. In the circuit shown in FIG. 3, the same component parts as those of FIG. 1 are indicated by the same reference numerals. The details of such parts are omitted from the following description. Referring to FIG. 3, the camera is provided with the control circuit 10 which is composed of a microcomputer, etc., a known distance measuring circuit 15, a known light measuring circuit 16, a transistor 17; a switch 18 which is arranged to be turned on by the first stroke of operation on a shutter release button, a switch 19 which is arranged to be turned on by the second stroke of operation on the release button, a switch 20 which is provided for detecting the presence or absence of a film which is employed as an image recording medium, and an exposure control circuit 21 which is arranged to perform exposure control on the basis of information obtained from the light measuring circuit 16.

Figure 4:
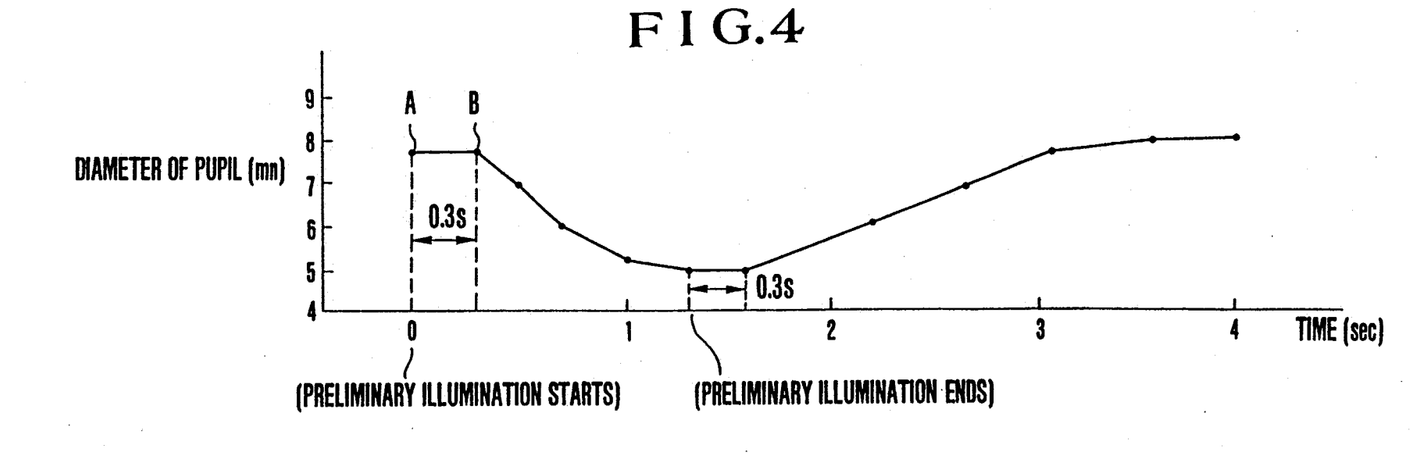
FIG. 4 is a graph showing the behavior of the human pupil taking place in response to preliminary illumination.
Figure 5:
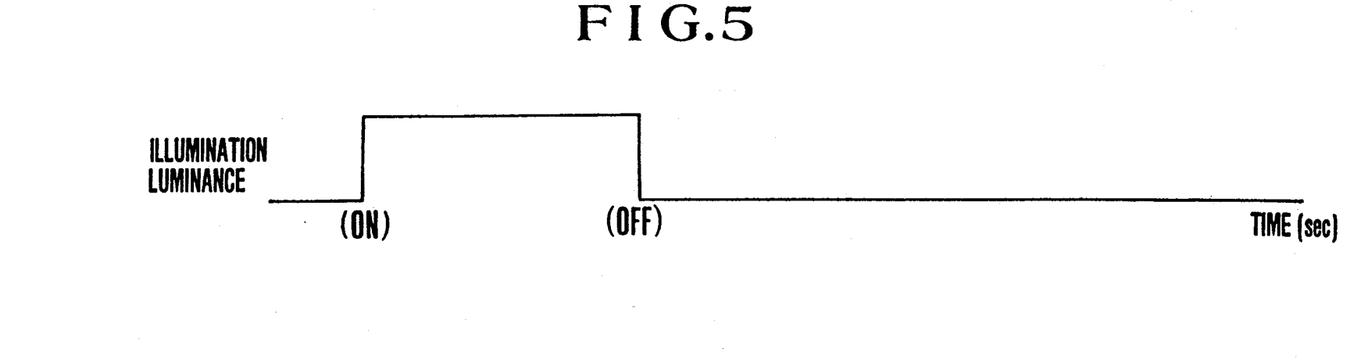
FIG. 5 shows the distribution of luminance of preliminary illumination.

FIG. 4 shows how the human pupil behaves in response to the preliminary illumination. In FIG. 4, the abscissa axis shows time and the ordinate axis the opening degree of the pupil. FIG. 5 shows the distribution of the luminance of light emission obtained by the preliminary illumination. The abscissa axis shows time and the ordinate axis the luminance of light emission.

In cases where ambient luminance (the luminance of field) is extremely dark, the diameter of the human pupil is about 7.8 mm as indicated at a point A in FIG. 4. When the eye is illuminated in the manner as shown in FIG. 5 in this state, the pupil begins to become smaller after the lapse of about 0.3 sec. as indicated at a point B in FIG. 4. The pupil reaches its minimum diameter and stops moving about 1.3 sec. after the start of illumination. When the illumination is brought to a stop, the pupil remains at the minimum opening degree for 0.3 sec. after the stop of illumination. The pupil then comes back to its original opening degree after the lapse of 2.4 sec.

Figure 6:
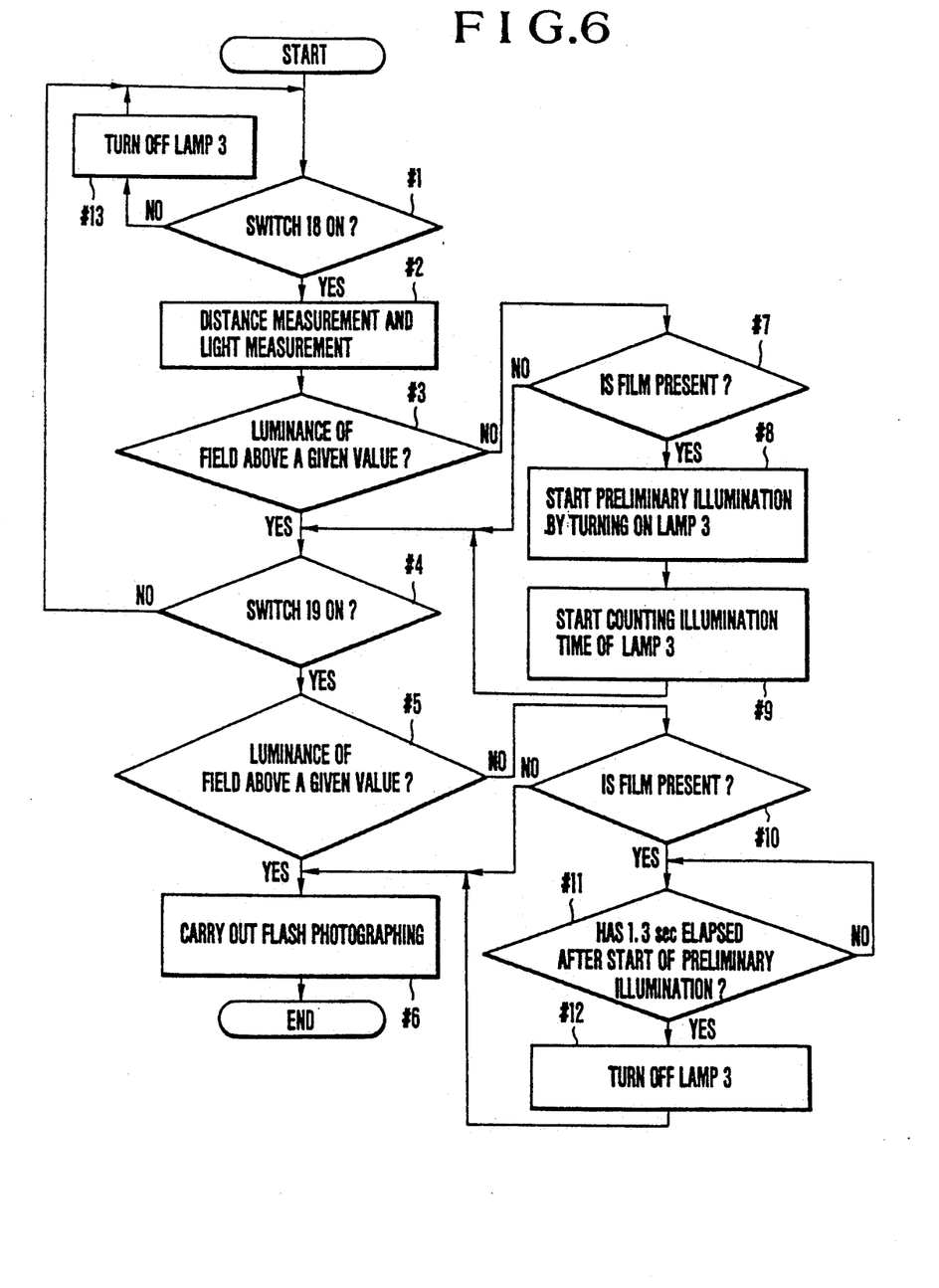
FIG. 6 is a flow chart showing the operation of the circuit of FIG. 3.

This embodiment is arranged to perform the preliminary illumination on the pupil prior to flash photographing by utilizing the above-stated characteristic of the pupil. The following describes the operation of the circuit of FIG. 3 with reference to FIG. 6 which is a flow chart showing the operation of the control circuit shown in FIG. 3. To simplify the illustration, FIG. 6 shows only the operation to be performed when a flash photography mode is selected.

At a step #1: The switch 18 turns on when the first stroke of operation is performed on the shutter release button. At step #2: The control circuit 10 allows the electric power to be applied to each circuit by lowering the level of the base of the transistor 17 and causes the distance measuring circuit 15 and the light measuring circuit 16 to begin their distance and light measuring actions. At a step #3: A check is made to find if the luminance of field obtained by the light measuring circuit 16 is above a given value. If so, it indicates that the pupil is closed by the ambient luminance and the preliminary illumination lamp 3 does not have to be turned on. Therefore, the flow comes to a step #4. At the step #4: A check is made to find whether the switch 19 is turned on by the second stroke of operation on the release button.

In a case where the luminance of field is found to be less than the given value, the flow comes to a step #7. At the step #7: The switch 20 is checked for the presence of a film in the camera. If the camera is thus found to be loaded with the film, the flow comes to a step #8. At the step #8: The level of the base of the transistor 11 is raised to a high level to turn on the preliminary illumination lamp 3 for preliminary illumination. At the same time, the flow comes to a step #9 to start counting to measure the illumination time of the lamp 3. In a case where the camera is found at the step #7 to be loaded with no film, the preliminary illumination by means of the lamp 3 is not performed by keeping the base of the transistor 11 at a low level for the purpose of saving the battery power. This occurs, for example, when the release button is inadvertently pressed to its first stroke position.

After that, when the switch 19 is found to be turned on by the second stroke of operation on the release button at the step #4, the flow comes to a step #5. At the step #5: Again, a check is made to find if the luminance of field is above the given value. If so, the flow comes to a step #6. At the step #6: The control circuit 10 immediately sends a trigger signal to the trigger circuit 14 to flash the xenon lamp 1 and to cause the exposure control circuit 21 to carry out flash photographing. In this instance, the red-eye phenomenon is never brought about by flash photographing without the preliminary illumination as the pupil is closed to its minimum opening position by the ambient luminance.

Further, if the luminance of field is found to be less than the given value at the step #5, the flow comes to a step #10 to find whether the camera is loaded with a film like at the step #7. If the camera is found to be not loaded with any film, the control circuit 10 immediately sends the trigger signal to the trigger circuit 14 to flash the xenon lamp 1 and causes flash photographing to be carried out through the exposure control circuit 21. The camera is found not to be loaded with any film at the step #10 either when the release button is inadvertently pushed down to its second stroke position or in the event of a trial shot made for confirmation of the flashing action of the flash device.

Meanwhile, if the camera is found to be loaded with a film at the step #10, the flow comes to a step #11. At the step #11: A check is made for the lapse of time (about 1.3 sec.) required in closing the human pupil after the preliminary illumination. If the time is found to have elapsed, the flow comes to a step #12 to immediately turn off the preliminary illumination lamp 3 by lowering the level of the base of the transistor 11. If not, the flow waits for the lapse of the required time before coming to the step #12. After execution of the step #12, the flow comes to the step #6. The control circuit 10 then sends the trigger signal to the trigger circuit 14 to flash the xenon lamp 1 and thus causes flash photographing to be carried out through the exposure control circuit 21. In this case, since the pupil has been closed to its minimal position by the preliminary illumination, the red-eye phenomenon is effectively prevented.

Further, if the switch 19 is found to be in an off-state at the step #4, the flow comes back to the step #1 to find if the other switch 18 is in an on-state. If the switch 18 is found to be also in an off-state, the flow comes to a step #13 to turn off the preliminary illumination lamp 3 because the lamp 3 has been left turned on.

In the case of ordinary photography other than flash photography, the above-stated preliminary illumination is of course not necessary.

Further, the given value to be used at the steps #3 and #5 is set at such a relatively low degree of luminance value that requires the use of the flash device for adequate photo-taking exposure but is not causing the red-eye phenomenon as it is sufficiently bright for closing the pupil. In other words, the given value is determined in consideration of such a luminance degree of field that requires use of a flash light for a back-light shot.

The method of turning on the preliminary illumination lamp 3 by keeping the release button in its first stroke position enables the photographer to select a length of lighting time for the lamp 3 as desired. However, a sufficient red-eye phenomenon preventing effect cannot be attained if the lighting time of the lamp 3 is too short. Therefore, the embodiment is arranged to begin flash photographing only after the lapse of preliminary illumination time sufficiently long for closing the pupil in a case where the release button is pushed further down to its second stroke position before the lapse of the sufficient long lighting time of the lamp 3. This ensures that the red-eye phenomenon can be effectively prevented even in such a case.

In a case where the pupil is closed by a certain degree of luminance of field in carrying out flash photographing, the red-eye phenomenon never occurs without turning on the preliminary illumination lamp 3. In that case, the embodiment omits the process of preliminary illumination. That arrangement not only saves the battery from being wasted but also serves to prevent a release time lag from being increased by the time required for illumination with the lamp 3. Further, in a case where the camera is not loaded with any film, the battery likewise can be saved from being wasted.

Further, while the embodiment is arranged to have at least 1.3 sec. for the preliminary illumination, this time value is of course adjustable as desired.

Second Embodiment

Figure 7:
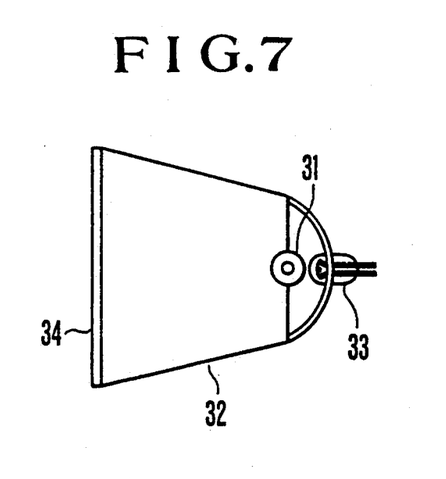
FIG. 7 is a sectional view of an electronic flash device arranged as a second embodiment of the invention.

FIG. 7 shows in a sectional view an electronic flash device arranged according to this invention as a second embodiment thereof. The illustration includes a xenon tube 31 which is employed as a light emitting part for flash photography, a reflection shade 32, a preliminary illumination lamp 33 which is employed as a light emitting part for preventing the red-eye phenomenon and a protector 34. The protector 34 is, for example, a light condensing member such as a Fresnel lens. The lamp 33 is preferably disposed, from an optical point of view, as close as possible to the focal point of the parabola of the reflection shade 32 for a higher condensing effect. In view of this, the lamp 33 is disposed, in the case of the second embodiment, on the optical axis of the xenon tube 31. The arrangement enhances the condensing effect of the light of the lamp 33 for a higher degree of luminance. A higher luminance degree of light has a better effect in closing the human pupil. With the lamp 33 positioned in this manner, the effect of preventing the red-eye phenomenon can be increased. Further, the driving circuit of the second embodiment is identical with that of the first embodiment and is, therefore, omitted from description.

Third Embodiment

Figure 8:
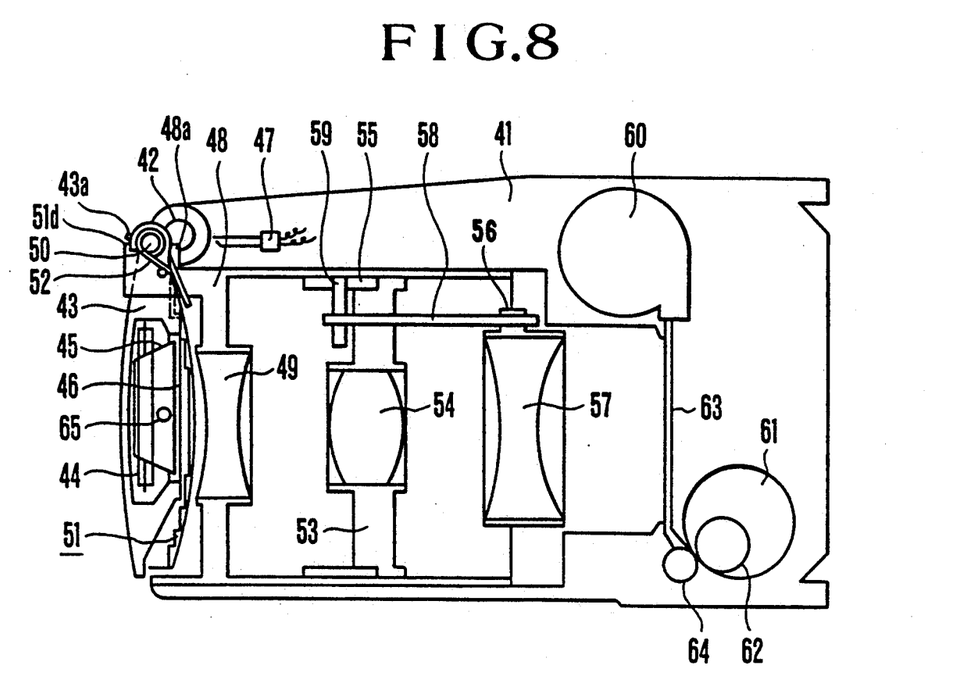
FIG. 8 is a longitudinal sectional view of a camera shown in FIG. 9.
Figure 9:
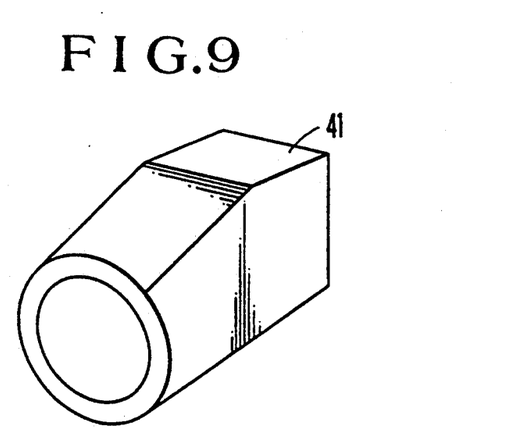
FIG. 9 is an oblique view showing in outline the camera as in a state of having the flash device stowed therein.
Figure 10:
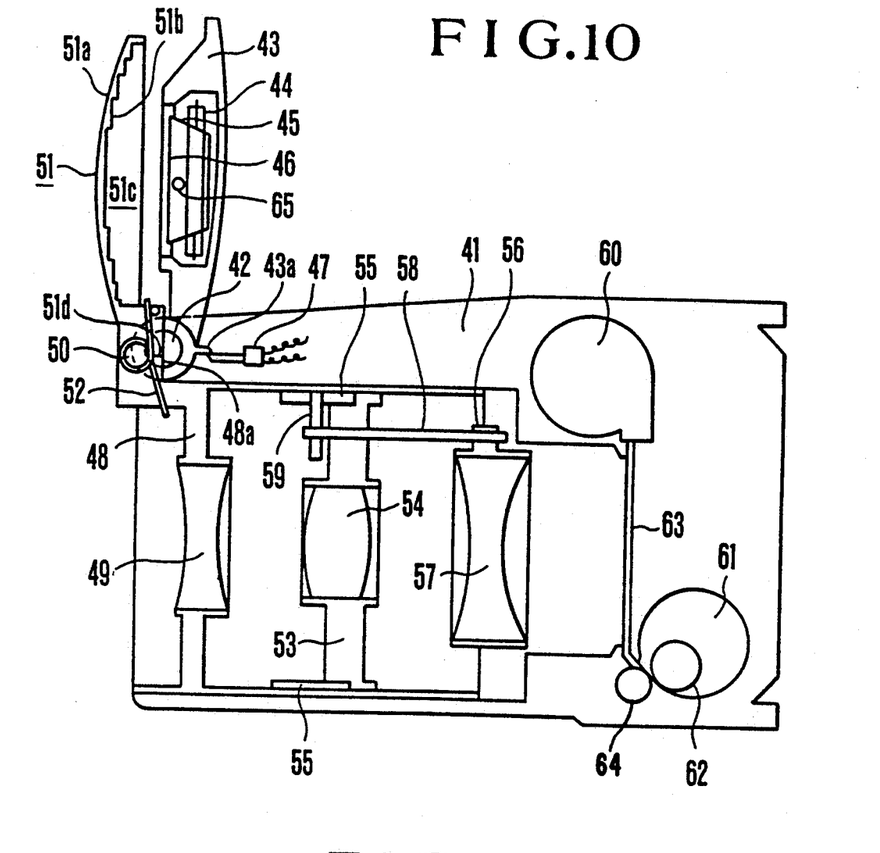
FIG. 10 is a longitudinal sectional view of a camera shown in FIG. 11.
Figure 11:
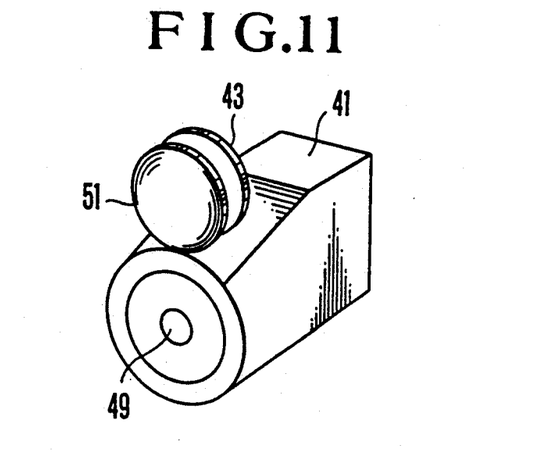
FIG. 11 is an oblique view showing the camera as in a wide-angle shooting position.
Figure 12:
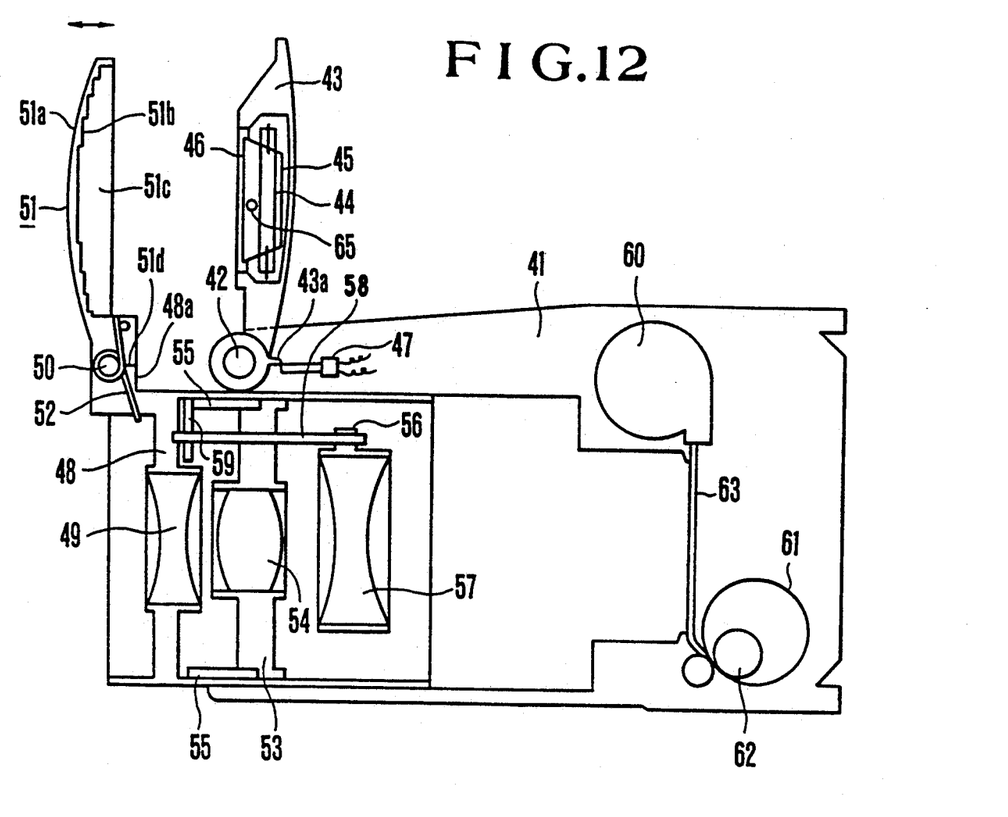
FIG. 12 is a longitudinal sectional view of the camera as in a telephoto shooting position.
Figure 13:
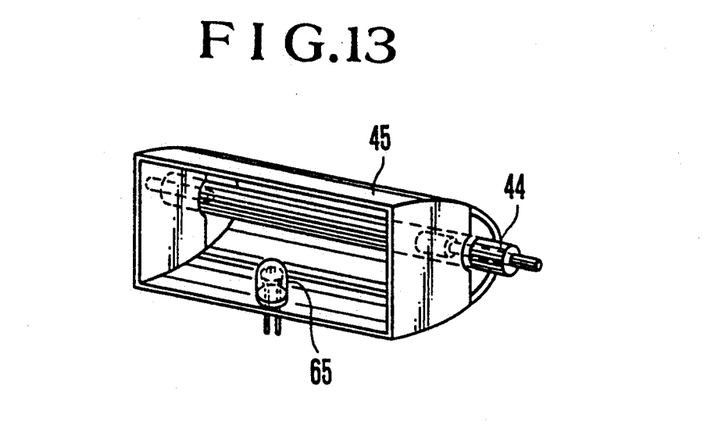
FIG. 13 is an oblique view showing the arrangement of the flash light emitting part of the embodiment.

A third embodiment of the invention is arranged as shown in FIGS. 8 to 13. Of these drawings, FIG. 8 is a longitudinal sectional view of the camera which is shown in FIG. 9. FIG. 9 is an oblique view showing in outline the camera in a state of stowing a flash device therein. FIG. 10 is a longitudinal sectional view showing the camera of FIG. 11 as in a wide-angle shooting position. FIG. 11 is an oblique view showing in outline the camera in the wide-angle shooting position. FIG. 12 is a longitudinal sectional view showing the camera in a telephoto shooting position. FIG. 13 is an oblique view showing a flash light emitting part. Referring to these drawings, a camera body 41 has a circular front side and cylindrically extends in the optical axis direction. A pivot shaft 42 is disposed approximately on the upper front edge of the camera body 41. A flash light emitting part 43 is pivotally attached to the camera body 41 in such a way as to be turnable on the pivot shaft 42. Further, a flash tube 44 is employed as a light emitting part for flash photography. A reflection shade 45 is provided with a light transmissive protection plate 46. The protection plate 46 is disposed in front of the reflection shade 45. A preliminary illumination lamp 65 is employed as a light emitting part for preventing the red-eye phenomenon. A flash light emitting unit is formed by these members. The preliminary illumination lamp 65 is mounted on the reflection shade 45. The light emitted from the lamp 65 is thus arranged to be reflected by the reflection shade 45 and is directed to a photo-taking object at a given angle of light distribution. Further, a friction member such as a wave washer is interposed between the above-stated pivot shaft 42 and the shaft hole of the flash light emitting part 43. The part 43 is thus arranged to be held in a desired turning position relative to the camera body 41 by virtue of the wave washer which is not shown. A main switch 47 is disposed near to the above-stated pivot shaft 42. The main switch 47 is arranged to be in an off-state in which two contact pieces thereof are separated from each other when the camera is in a carryable state (a flash device stowing state) as shown in FIG. 8. A protruding action part 43a is formed near to the shaft hole of the flash light emitting part 43. When the flash light emitting part 43 is turned about 180 degrees upward, the acting part 43a pushes the contact pieces of the main switch 47 to turn on the main switch 47. A first lens group block 48 which serves as a photo-taking lens barrel of the camera is arranged to carry a first photo-taking lens group 49 and has a pivot shaft 50 disposed approximately on the upper front edge. A Fresnel lens 51 which is a light condensing member is pivotally attached to the first lens group block 48 through the pivotal shaft 50. The Fresnel lens 51 consists of a convex arcuate external surface 51a, an internal surface 51b which is formed into a Fresnel form on the side opposite to the external surface 51a; and a recessed part 51c in which a protruding part (on the side of the protection plate 46) of the flash light emitting part 43 is placed when the flash device (the flash light emitting part 43) is stowed into the camera. A spring 52 is arranged to urge the Fresnel lens 51 to turn clockwise. The urging force of the spring 52 is set at a value less than the friction force of the flash light emitting part 43 on the pivot shaft 42. Therefore, when the flash light emitting part 43 is manually turned clockwise from its state shown in FIG. 8, the Fresnel lens also turns clockwise following the part 43. Then, the turning movement comes to a stop when a stopper 51d which is disposed near to the rotation center of the Fresnel lens 51 comes to abut on an angular part 48a which is disposed above the first lens group block 48, as shown in FIG. 10. A second lens group block 53 is arranged to carry a second photo-taking lens group 54. A differential cam 55 is formed in one unified body with the second lens group block 53. A third lens group block 56 is arranged to carry a third photo-taking lens group 57. The third lens group block 56 is provided with a third lens group bar 58 and a follower 59 which is disposed near the left end of the third lens group bar 58 and is arranged to move together with the third lens group bar 58. A known film cartridge 60 contains film. The film pulled out from the cartridge 60 is wound around a spool 62 disposed within a spool chamber 61. The film is taken up onto the spool 62 after passing an aperture 63 where the film can be exposed to light. A roller 64 is arranged to push the film against the spool 62.

The third embodiment which is arranged in the manner as described above operates as follows. The flash device stowing state of the embodiment is first described. In this state, the Fresnel lens 51 is stowed in a folded shape in a recessed part formed on the front side of the camera body 41. Since the front side of the first lens group 49 is in a concave shape under this condition, the external surface of the Fresnel lens 51 never abuts on the first lens group 49. Meanwhile, the flash light emitting part 43 is likewise folded down on the front side of the camera body 41. In this case, the protection plate 46 of the flash light emitting part 43 is opposed to the inner surface 51b of the Fresnel lens 51 and is stowed in the above-stated recessed part 51c. Further, the Fresnel lens 51 is formed in a meniscus lens shape having a convex part in the middle thereof. This shape not only imparts a sufficient strength to the Fresnel lens 51 but also gives sufficient stowing space.

Figure 14A:
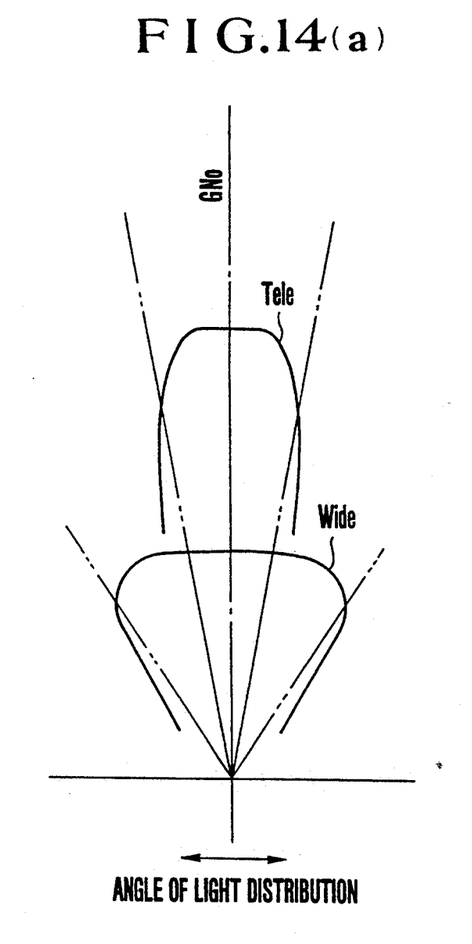
FIGS. 14(a) and 14(b) show the luminance distribution characteristic of the flash device and that of the red-eye phenomenon preventing device of the same embodiment.

In using the flash device for a wide-angle shot, the embodiment operates as follows. To get the camera ready for this operation, the flash device can be manually set in position by applying a finger to the lower end of the flash light emitting part 43 and by turning it from its state of FIG. 8 about 180 degrees clockwise on the pivot shaft 42 to bring it into a state as shown in FIGS. 10 and 11. As mentioned above, the Fresnel lens 51 follows the movement of the flash light emitting part 43 by turning also clockwise about 180 degree on its pivot shaft 50. The Fresnel lens 51 and the flash light emitting part 43 are thus brought into the state of FIG. 10 with a given space kept between them. The pivot shaft 50 of the Fresnel lens 51 is disposed farther forward than the pivot shaft 42 of the flash light emitting part 43 in front of the camera body 41 (on the left side as viewed in FIG. 10). Therefore, compared with the flash device stowing state as shown in FIG. 8, the space between the flash light emitting part 43 and the Fresnel lens 51 becomes wider. This arrangement enhances the light condensing effect attainable with the Fresnel lens 51. Further, in the flash device using state shown in FIG. 10, the optical axis of the flash light emitting part 43 and that of the Fresnel lens 51 coincide with each other. This arrangement gives a flash light distribution angle corresponding to the wide-angle shooting position of the photo-taking optical system of the camera. Meanwhile, the preliminary illumination lamp 65 which is provided for preventing the red-eye phenomenon is disposed close to the flash tube 44. The light distributing characteristic of the lamp 65 is shown in FIG. 14(a). As shown, the light distribution characteristic of the lamp 65 resembles that of the flash light shown in FIG. 14(b).

Further, when the flash light emitting part 43 is ready for use by turning it upward as mentioned above, the action part 43a of the flash light emitting part 43 turns on the main switch 47. This allows the photographer to operate a shutter release button, etc., which are not shown. In other words, this brings the camera into a so-called standby state.

Figure 14B:
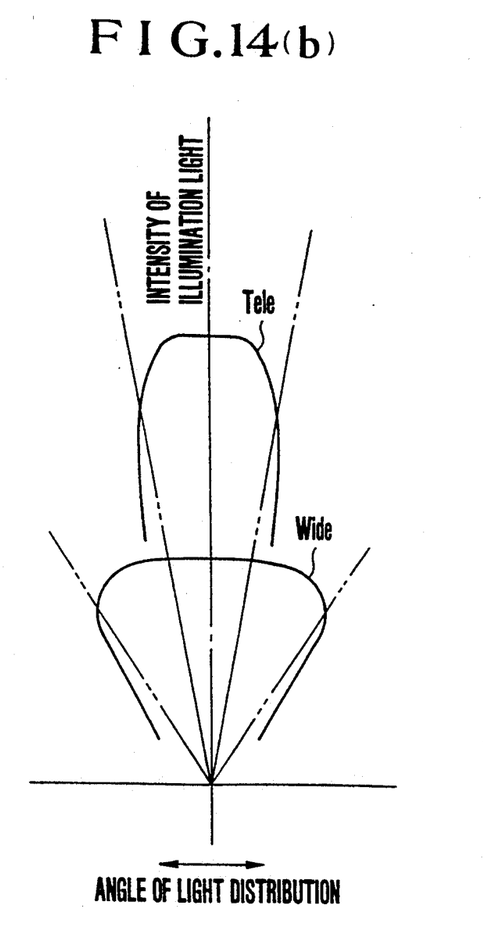

Next, the operation of the embodiment in using the flash device for a telephoto shot is described with reference to FIG. 12 as follows. The first lens group block 48 is first moved forward from the front side of the camera along the optical axis (leftward as viewed on FIG. 10). The Fresnel lens 51 which is arranged in one unified body with the first lens group block 48 also moves along with the first lens group block 48 in the same direction. This increases the space between the Fresnel lens 51 and the flash light emitting part 43. Therefore, the flash light of the flash tube 44 and the red-eye phenomenon preventing light of the lamp 65 can be efficiently condensed according to the zooming movement of the photo-taking optical system with a light distributing characteristic (at a light distribution angle) corresponding to the zooming of the optical system as shown in FIGS. 14(a) and 14(b). When the camera is set in the condition as shown in FIG. 12, the air spaces between the first lens group 49 and the second lens group 54 and between the second lens group 54 and the third lens group 57 are changed from the spaces shown in FIG. 10. The wide-angle position of the photo-taking optical system is thus shifted to a telephoto position.

The description of the driving circuit of the third embodiment is omitted, because it is identical with that of the first embodiment described in the foregoing.

Fourth Embodiment

A fourth embodiment of this invention is described with reference to FIGS. 15 to 18 as follows. In this case, the light condensing lens of the flash device is arranged to be stationary. Meanwhile, a light emitting unit is arranged to be movable to ensure efficient illumination at an adequate light distribution angle (characteristic) with the flash light and the red-eye phenomenon preventing lamp. The position of the light emitting unit is shifted according to a change in the focal length of the photo-taking lens.

Figure 15:
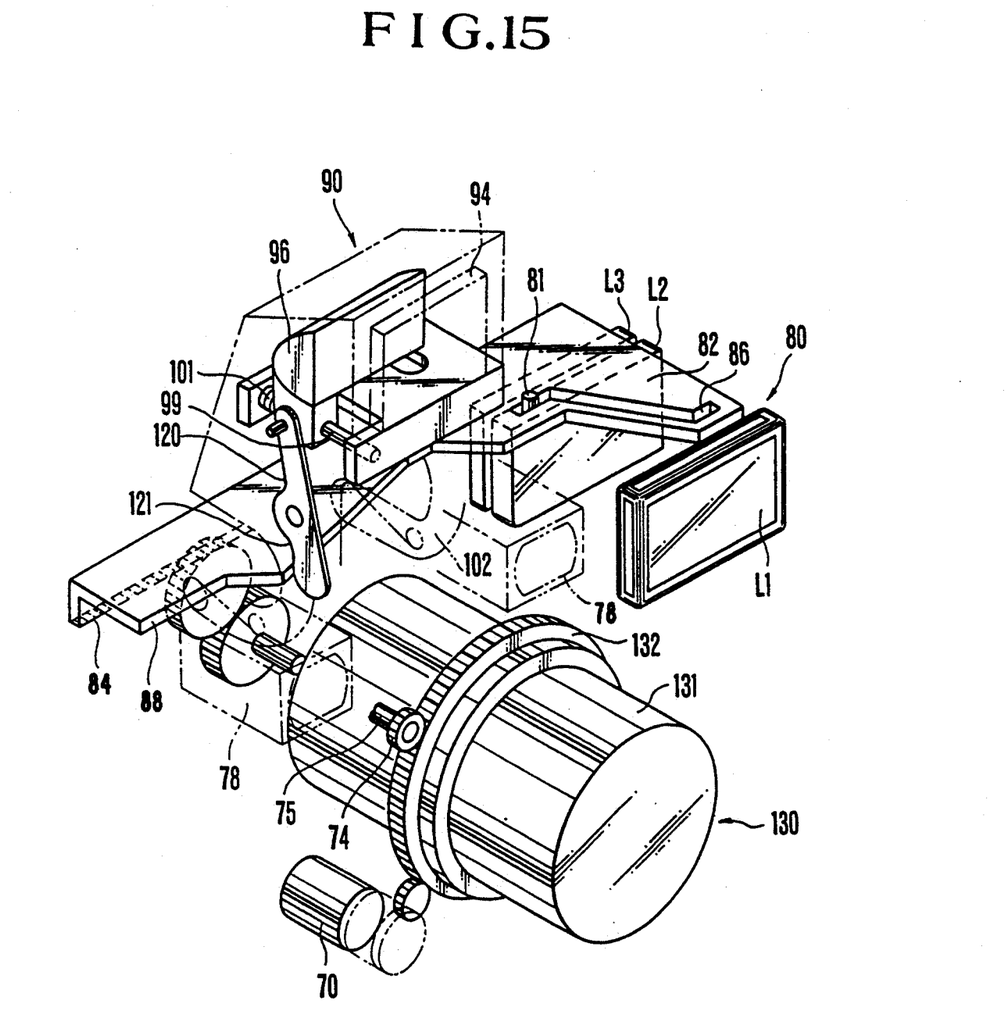
FIG. 15 is an oblique view of the camera.

FIG. 15 is an oblique view showing in outline a lens-shutter type camera provided with a zoom lens and a zoom flash device arranged according to the invention. This camera comprises a zoom lens barrel block 130, a zoom motor 70 which is arranged to drive the lens barrel block 130, the zoom flash device 90 and a power-variable viewfinder device 80 which consists of lenses L1, L2 and L3. They are mounted on a camera body which is not shown.

Like in the case of FIG. 13, a preliminary illumination lamp which is not shown is mounted on the reflection shade of the light emitting part 96 of the zoom flash device 90.

Figure 18:
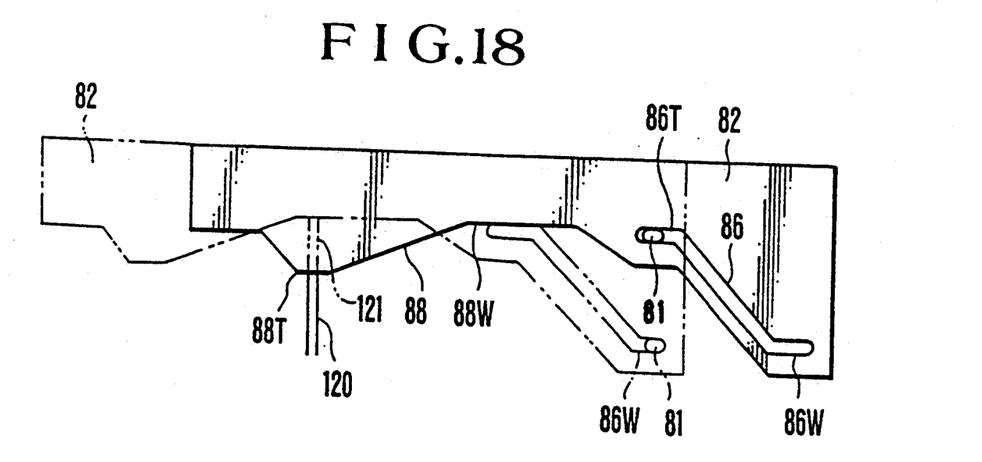
FIG. 18 is a plan view of a cam plate included in the same embodiment.

The basic arrangement of the camera of this (fourth) embodiment is as follows. The light emitting part 96 of the zoom flash device 90 and the lens L2 of the power-variable viewfinder device 80 are arranged to be driven by shifting right and left the position of a cam plate 82. The light emitting part 96 is movable back and forth along the optical axis by a joint action of an illumination angle varying cam face 88 (88T to 88W) of the cam plate 82 and a zoom lever 120. The lens L2 is movable back and forth along the optical axis by a joint action of its protruding part 81 and a cam slot 86 (86T to 86W) of the cam plate 82 which is fitted on the protruding part 81.

The movement of the light emitting part 96 and that of the lens 131 L2 vary with the focal length of the zoom lens. Referring to FIG. 18, the right end position of the cam plate 82 indicated by a full line represents a long focal length position while its left end position indicated by a two-dot chain line represents a short focal length position. A rack 84 which is formed along the lower end face of a bent part of the cam plate 82 and the output gear of a reduction gear train 78 are arranged to jointly impart a driving force to the cam plate 82 in association with the power varying action of the zoom lens. For this purpose, a pinion 74 which is provided on the input shaft 75 of the reduction gear train is arranged to engage a sector gear 132 which is provided on the lens barrel block 130.

The light emitting part 96 of the flash device 90 is constantly urged toward the short focal length side by a spring 101 along a shaft 99. The cam abutting face 121 of the zoom lever 120 which is attached to lever 102, is thus arranged to be constantly abutting on the cam face 88 of the cam plate 82. The lever 102 has a pivot 103 to which a spring 104 is attached.

Referring to FIG. 15, when a zooming operation is performed, a zoom motor 70 rotates to cause the zooming action of the lens barrel block 130. Then, the cam plate 82 makes a reciprocating motion right and left through the sector gear 132, the pinion 74, the reduction gear train 78 and the rack 84. The movement of the cam plate 82 causes the magnification, i.e., the field, of the power-variable viewfinder device 80 to change accordingly as the focal length of the lens barrel block 130 changes. At the same time, the zoom lever 120 having the cam abutting face 121 which comes into sliding contact with the illumination angle varying cam face 88 swings to move the light emitting part 96 back and forth. The illumination angle of the zoom flash device 90 thus changes according to the change in the focal length (angle of view) of the lens barrel block 130. The change in the illumination angle of the zoom flash device 90 causes the light distribution characteristic of the flash device and that of the red-eye phenomenon preventing lamp as shown in FIGS. 14(a) and 14(b) in the same manner as the third embodiment.

Figure 16:
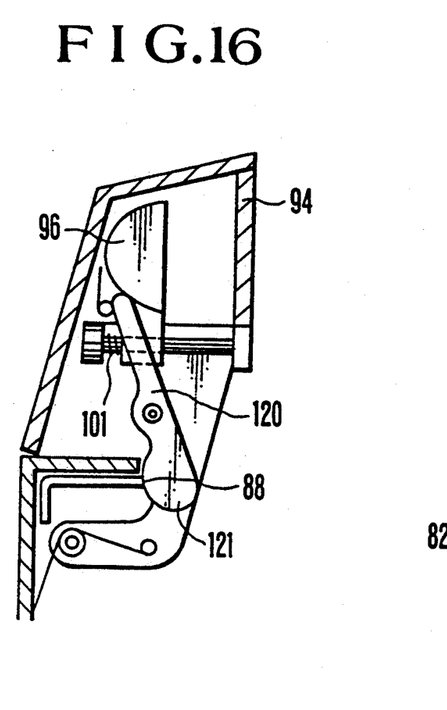
FIGS. 16 and 17 are sectional views showing the fourth embodiment as in operating states.
Figure 17:
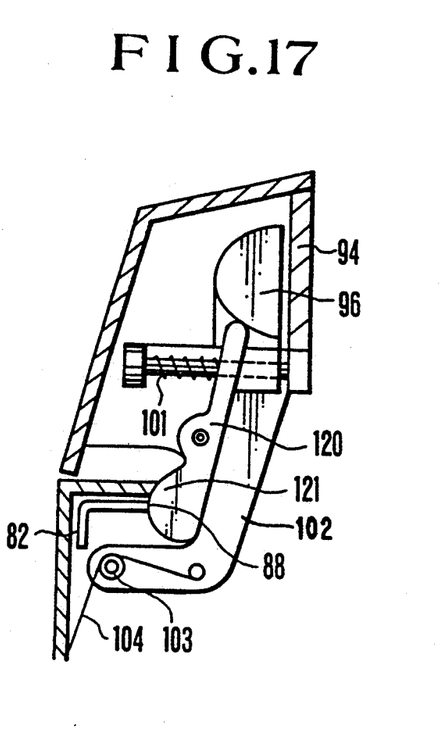

FIG. 16 shows the light emitting part 96 in a minimum illumination angle position which is at the utmost distance from the light condensing lens 94. Conversely, FIG. 17 shows the light emitting part 96 in a maximum illumination angle position which is located closest to the the light condensing lens 94.

The description of the driving circuit of the fourth embodiment is omitted, because it is identical with that of the first embodiment described in the foregoing.

In the third and fourth embodiments, the method of varying the angle of illumination, to which the present invention is applied, may be attained by making the reflection shade variable or by taking other various means.

The third and fourth embodiments have been described as arranged to mechanically vary the illumination angle of the flash device in association with the movement of the photo-taking zoom lens. However, this invention is not limited to such mechanical arrangement. In accordance with the invention, a camera may be arranged to convert information on the focal length of the lens into an electrical signal, like in the case of a single-lens reflex camera, to transmit the signal to a flash device and to determine the zooming position of the flash device according to this signal on the side of the flash device. It is also possible to vary the light distributing characteristic stepwise instead of zooming the flash device.

Further, a lamp is used as a light source for preventing the red-eye phenomenon in each of the embodiments described. However, the invention is not limited to the use of a lamp for this purpose. Any light emitting manner such as LED or the like may be employed in place of the lamp.

It goes without saying that, in accordance with this invention, an auxiliary light emitting part for automatic focusing may be arranged to serve as the red-eye phenomenon preventing light emitting part of each of the embodiments described.

Each of the embodiments described is capable of giving a sufficient red-eye phenomenon preventing effect without necessitating any arrangement to increase the output of the light emitting part provided for the prevention of the red-eye phenomenon. This permits use of a compact, low-cost lamp as the red-eye phenomenon preventing light emitting part. Further, a reflection shade, a protector and a Fresnel lens are used in combination for both the light emitting part for prevention of the red-eye phenomenon and the light emitting part for flash photography. That feature not only permits reduction in cost but requires no extra space for the red-eye phenomenon preventing light emitting part, so that the camera can be arranged in a compact size. The invention is, therefore, highly advantageous in practical applications.

What is claimed is:

1. A red-eye phenomenon preventing device comprising:
   a) a flash tube for flash photography;
   b) a light emitting element for preventing the red-eye phenomenon;
   c) a reflection shade arranged to surround said flash tube for flash photography and said light emitting element for preventing the red-eye phenomenon, said flash tube and said light emitting element being arranged at different positions relative to said reflection shade;
   d) a protector disposed in front of said flash tube for flash photography and said light emitting element for preventing the red-eye phenomenon; and
   e) control means including first means for excitation of said light emitting element for preventing the red-eye phenomenon for a predetermined time period and providing output indication of the expiration of said predetermined time period and second means responsive to said output indication for initiating excitation of said flash tube for flash photography.

2. A device according to claim 1, wherein said flash tube is a xenon flash tube.

3. A device according to claim 2, wherein said light emitting element for preventing the red-eye phenomenon is a preliminary illumination lamp.

4. A device according to claim 1, wherein said light emitting element for preventing the red-eye phenomenon is a preliminary illumination lamp.

5. A device according to claim 1, wherein said light emitting element for preventing the red-eye phenomenon is disposed on an optical axis of said flash tube for flash photography.

6. A device according to claim 1, wherein said protector includes a condenser lens.

7. A device according to claim 1, further comprising light distribution characteristic varying means for varying a light distribution characteristic of said flash tube for flash photography and that of said light emitting element for preventing the red-eye phenomenon.

8. A device according to claim 7, wherein said light distribution characteristic varying means includes means for varying said light distribution characteristic in accordance with a change in the focal length of a photo-taking optical system.

9. A device according to claim 7, wherein said light distribution characteristic varying means includes means for reducing the angle of illumination of said flash tube for flash photography and that of said light emitting element for preventing the red-eye phenomenon as the focal length of said photo-taking optical system changes to a longer focal length.

10. A device according to claim 7, wherein said light distribution characteristic varying means includes means for increasing the angle of illumination of said flash tube for flash photography and that of said light emitting element for preventing the red-eye phenomenon as the focal length of said photo-taking optical system changes to a shorter focal length.

11. A device according to claim 7, wherein said light distribution characteristic varying means includes means for moving said light emitting element for preventing the red-eye phenomenon.

12. A device according to claim 7, wherein said light distribution characteristic varying means includes means for driving said light emitting element for preventing the red-eye phenomenon.

13. A device according to claim 7, wherein said light distribution characteristic varying means includes means for moving said reflection shade.

14. A device according to claim 7, wherein said light distribution characteristic varying means includes means for driving said reflection shade.

15. A device according to claim 1, further comprising a transistor for turning on said light emitting element for preventing the red-eye phenomenon, said light emitting element for preventing the red-eye phenomenon being connected between an emitter of said transistor and a ground.

16. A red-eye phenomenon preventing device comprising:
 a) a flash tube for flash photography;
 b) a light emitting element for preventing the red-eye phenomenon;
 c) a reflection shade arranged to surround said flash tube for flash photography and said light emitting element for preventing the red-eye phenomenon, said flash tube and said light emitting element being arranged at different positions relative to said reflection shade;
 d) a condenser lens disposed in front of said flash tube for flash photography and said light emitting element for preventing the red-eye phenomenon; and
 e) control means including first means for excitation of said light emitting element for preventing the red-eye phenomenon for a predetermined time period and providing output indication of the expiration of said predetermined time period and second means responsive to said output indication for initiating excitation of said flash tube for flash photography.

17. A device according to claim 16, wherein said flash tube is a xenon flash tube.

18. A device according to claim 17, wherein said light emitting element for preventing the red-eye phenomenon is a preliminary illumination lamp.

19. A device according to claim 16, wherein said light emitting element for preventing the red-eye phenomenon is disposed on an optical axis of said flash tube for flash photography.

20. A device according to claim 16, further comprising light distribution characteristic varying means for varying a light distribution characteristic of said flash tube for flash photography and that of said light emitting element for preventing the red-eye phenomenon.

21. A device according to claim 20, wherein said light distribution characteristic varying means includes means for varying said light distribution characteristic in accordance with a change in the focal length of a photo-taking optical system.

22. A device according to claim 20, wherein said light distribution characteristic varying means includes means for reducing the angle of illumination of said flash tube for flash photography and that of said light emitting element for preventing the red-eye phenomenon as the focal length of said photo-taking optical system changes to a longer focal length.

23. A device according to claim 20, wherein said light distribution characteristic varying means includes means for increasing the angle of illumination of said flash tube for flash photography and that of said light emitting element for preventing the red-eye phenomenon as the focal length of said photo-taking optical system changes to a shorter focal length.

24. A device according to claim 20, wherein said light distribution characteristic varying means includes means for moving said light emitting element for preventing the red-eye phenomenon.

25. A device according to claim 20, wherein said light distribution characteristic varying means includes means for driving said light emitting element for preventing the red-eye phenomenon.

26. A device according to claim 20, wherein said light distribution characteristic varying means includes means for moving said reflection shade.

27. A device according to claim 20, wherein said light distribution characteristic varying means includes means for driving said reflection shade.

28. A device according to claim 20, wherein said light distribution characteristic varying means includes means for moving said condenser lens.

29. A device according to claim 20, wherein said light distribution characteristic varying means includes means for driving said condenser lens.

30. A device according to claim 16, further comprising a transistor for turning on said light emitting element for preventing the red-eye phenomenon, said light emitting element for preventing the red-eye phenomenon being connected between an emitter of said transistor and a ground.

31. A red-eye phenomenon preventing device comprising:
   a) a flash tube for emitting means for emitting an illumination light for flash photography;
   b) a light emitting element for emitting an illumination light for preventing the red-eye phenomenon;
   c) reflecting means for condensing the lights emitted by said flash tube and said light emitting element, said flash tube and said light emitting element being arranged at different positions relative to said reflection shade; and
   d) control means including first means for excitation of said light emitting element for a predetermined time period and providing output indication of the expiration of said predetermined time period and second means responsive to said output indication for initiating excitation of said flash tube.

32. A device according to claim 31, wherein said flash tube is a xenon tube.

33. A device according to claim 32, wherein said light emitting element is a preliminary illumination lamp.

34. A device according to claim 31, wherein said light emitting element is disposed on an optical axis of said flash tube.

35. A device according to claim 31, further comprising light distribution characteristic varying means for varying a light distribution characteristic of said flash tube and that of said light emitting element.

36. A device according to claim 35, wherein said light distribution characteristic varying means includes means for varying said light distribution characteristic in accordance with a change in the focal length of a photo-taking optical system.

37. A device according to claim 35, wherein said light distribution characteristic varying means includes means for reducing the angle of illumination of said flash tube and that of said light emitting element as the focal length of said photo-taking optical system changes to a longer focal length.

38. A device according to claim 35, wherein said light distribution characteristic varying means includes means for increasing the angle of illumination of said flash tube and that of said light emitting element as the focal length of said photo-taking optical system changes to a shorter focal length.

39. A device according to claim 35, wherein said light distribution characteristic varying means includes means for moving said light emitting element.

40. A device according to claim 35, wherein said light distribution characteristic varying means includes means for driving said light emitting element.

41. A device according to claim 35, wherein said light distribution characteristic varying means includes means for moving said reflecting means.

42. A device according to claim 35, wherein said light distribution characteristic varying means includes means for driving said reflecting means.

43. A device according to claim 35, wherein said light distribution characteristic varying means includes means for driving said condenser lens.

44. A device according to claim 35, wherein said light distribution characteristic varying means includes means for driving said condenser lens.

45. A device according to claim 31, further comprising a transistor for turning on said light emitting element, said light emitting element being connected between an emitter of said transistor and a ground.

46. A camera comprising:
   a) a flash tube for flash photography;
   b) a light emitting element for preventing the red-eye phenomenon;
   c) a reflection shade arranged to surround said flash tube for flash photography and said light emitting element for preventing the red-eye phenomenon said flash tube and said light emitting element being arranged at different positions relative to said reflection shade;
   d) a protector disposed in front of said flash tube for flash photography and said light emitting element for preventing the red-eye phenomenon; and
   e) control means including first means for excitation of said light emitting element for preventing the red-eye phenomenon for a predetermined time period and providing output indication of the expiration of said predetermined time period and second means responsive to said output indication for initiating excitation of said flash tube for flash photography.

47. A camera according to claim 46, further comprising: a photo-taking optical system having a variable focal length; and light distribution characteristic varying means for varying, according to a change in the focal length of said photo-taking optical system, a light distribution characteristic of said flash tube for flash photography and that of said light emitting element for preventing the red-eye phenomenon.

48. A camera according to claim 46, further comprising a transistor for turning on said light emitting element for preventing the red-eye phenomenon, said light emitting element for preventing the red-eye phenomenon being connected between an emitter of said transistor and a ground.

49. A camera comprising:
   a) a flash tube for flash photography;
   b) a light emitting element for preventing the red-eye phenomenon;
   c) a reflection shade arranged to surround said flash tube for flash photography and said light emitting element for preventing the red-eye phenomenon, said flash tube and said light emitting element being arranged at different positions relative to said reflection shade;
   d) a condenser lens disposed in front of said flash tube for flash photography and said light emitting element for preventing the red-eye phenomenon; and
   e) control means including first means for excitation of said light emitting element for preventing the red-eye phenomenon for a predetermined time period and providing output indication of the expiration of said predetermined time period and second means responsive to said output indication for initiating excitation of said flash tube for flash photography.

50. A camera according to claim 49, further comprising: a photo-taking optical system having a variable focal length; and light distribution characteristic varying means for varying, according to a change in the focal length of said photo-taking optical system, a light distribution characteristic of said flash tube for flash photography and that of said light emitting element for preventing the red-eye phenomenon.

51. A camera according to claim 49, further comprising a transistor for turning on said light emitting element for preventing the red-eye phenomenon, said light emitting element for preventing the red-eye phenomenon being connected between an emitter of said transistor and a ground.

52. A camera comprising:
   a) a flash tube for emitting an illumination light for flash photography;
   b) a light emitting element for emitting an illumination light for preventing the red-eye phenomenon;
   c) a reflecting shade arranged to surround said flash tube for flash photography and said light emitting element for preventing the red-eye phenomenon, said flash tube and said light emitting element being arranged at different positions relative to said reflection shade; and
   d) control means including first means for excitation of said light emitting element for a predetermined time period and providing output indication of the expiration of said predetermined time period and second means responsive to said output indication for initiating excitation of said flash tube.

53. A camera according to claim 52, further comprising: a photo-taking optical system having a variable focal length; and light distribution characteristic varying means for varying, according to a change in the focal length of said photo-taking optical system, light distribution characteristics of said flash tube and said light emitting element.

54. A camera according to claim 52, further comprising a transistor for turning on said light emitting element, said light emitting element being connected between an emitter of said transistor and a ground.

55. A red-eye phenomenon preventing device, comprising:
   a) a flash tube for flash photography;
   b) a light emitting element for preventing the red-eye phenomenon;
   c) a reflection shade arranged to surround said light emitting element for preventing the red-eye phenomenon and said flash tube for flash photography, said light emitting element and said flash tube being arranged at different positions relative to said reflection shade;
   d) control means for excitation of said light emitting element prior to excitation of said flash tube to prevent the red-eye phenomenon; and
   e) a protector disposed in front of the flash tube for flash photography and the light emitting element for preventing the red-eye phenomenon, said protector being variably positionable relative to the flash tube and the light emitting element for varying the direction of light emitted by both the flash tube and the light emitting element.

56. A device according to claim 55 in which said protector is a condenser lens.

57. A device according to claim 55, in which the protector is variable in position relative to both the flash tube and the light emitting element in response to a zooming operation of a camera.

58. A red-eye phenomenon preventing device comprising:
   a) a flash tube for emitting an illumination light for flash photography;
   b) a light emitting element for emitting an illumination light for preventing red-eye phenomenon;
   c) a control circuit comprising a first circuit for flashing the flash tube by discharging a charge of a capacitor, and a second circuit for flashing the light emitting element by passing a power source output thereto; and
   d) reflection means surrounding said flash tube and said light emitting element.

59. A camera comprising:
   a) a flash tube for emitting an illumination light for flash photography;
   b) a light emitting element for emitting an illumination light for preventing red-eye phenomenon;
   c) a control circuit comprising a first circuit for flashing the flash tube by discharging a charge of a capacitor, and a second circuit for flashing the light emitting element by passing a power source output thereto; and
   d) reflection means surrounding said flash tube and said light emitting element.

60. A camera comprising:
   a) a flash tube for emitting an illumination light for flash photography;
   b) a light emitting element for emitting an illumination light for preventing the red-eye phenomenon;
   c) a reflection shade arranged to surround said flash tube and said light emitting element being arranged at different positions relative to said reflection shade; and
   d) control means for excitation of said light emitting element prior to excitation of said flash tube to prevent the red-eye phenomenon.

61. A camera comprising:
   a) a flash tube for flash photography;
   b) a light emitting element for preventing the red-eye phenomenon;
   c) a reflection shade arranged to surround said flash tube and said light emitting element being arranged at different positions relative to said reflection shade; and
   d) control means for excitation of said light emitting element prior to excitation of said flash tube to prevent the red-eye phenomenon.

* * * * *

UNITED STATES PATENT AND TRADEMARK OFFICE
CERTIFICATE OF CORRECTION

PATENT NO. : 5,285,232
DATED : February 8, 1994
INVENTOR(S) : Hidenori Taniguchi et al.

It is certified that error appears in the above-indentified patent and that said Letters Patent is hereby corrected as shown below:

Col. 3, line 64. After "At" insert -- a --.

Col. 5, line 32. Delete "the"

Col. 6, line 63. Delete ";"

Col. 7, line 53. Change "degree" to -- degrees --.

Col. 8, line 22. Change "on" to -- in --.

Col. 9, line 15. Delete "131"

Col. 9, line 16. After "lens" insert -- 131 --.

Signed and Sealed this

Sixteenth Day of August, 1994

Attest:

BRUCE LEHMAN

Attesting Officer      Commissioner of Patents and Trademarks